United States Patent
St. Onge et al.

(10) Patent No.: US 6,368,012 B1
(45) Date of Patent: Apr. 9, 2002

(54) COMPLIANT END EFFECTOR

(75) Inventors: Douglas L. St. Onge, Cudahy; Jesse E. Schrimpf, Waukesha, both of WI (US)

(73) Assignee: ABB Flexible Automation, Inc., New Berlin, WI (US)

( * ) Notice: Subject to any disclaimer, the term of this patent is extended or adjusted under 35 U.S.C. 154(b) by 0 days.

(21) Appl. No.: 09/469,512

(22) Filed: Dec. 22, 1999

(51) Int. Cl.[7] .................................................. F16B 21/00

(52) U.S. Cl. ........................................ 403/368; 403/370

(58) Field of Search ................................. 403/366, 367, 403/368, 370, 13, 14, 18; 901/10, 28, 29, 41

(56) References Cited

U.S. PATENT DOCUMENTS

| | | | |
|---|---|---|---|
| 4,155,169 A | | 5/1979 | Drake |
| 4,637,775 A | | 1/1987 | Kato |
| 4,718,798 A | | 1/1988 | Dumargue |
| 4,722,540 A | | 2/1988 | Kozyra |
| 4,749,001 A | | 6/1988 | Ring |
| RE32,854 E | * | 2/1989 | McCormick et al. ..... 901/29 X |
| 5,001,700 A | | 3/1991 | Rowden |
| 5,053,903 A | | 10/1991 | Harney |
| 5,117,671 A | | 6/1992 | Aikens |
| 5,165,829 A | | 11/1992 | Ross |
| 5,263,731 A | | 11/1993 | Deutschel |
| 5,422,768 A | | 6/1995 | Roehling |
| 5,472,553 A | | 12/1995 | Roberts |
| 5,483,398 A | | 1/1996 | Boutaghou |
| 5,735,034 A | | 4/1998 | Citron |
| 5,765,975 A | | 6/1998 | Hoffmann |
| 5,770,133 A | | 6/1998 | Bautaghou |
| 5,848,859 A | | 12/1998 | Clark |
| 5,964,124 A | * | 10/1999 | Nunes et al. .............. 901/49 X |
| 6,276,864 B1 | * | 8/2001 | Russo et al. .............. 403/13 X |

* cited by examiner

Primary Examiner—Lynne H. Browne
Assistant Examiner—John Cottingham
(74) Attorney, Agent, or Firm—Sokol Law Office

(57) ABSTRACT

The present invention relates to a compliant end effector for securing an implement or tool such as a spindle to an arm of an industrial robot. The end effector has an internal passageway that extends completely through the end effector for receiving the spindle. The end effector includes a mounting assembly, a gripping assembly, a compliant assembly and a biasing assembly. The mounting assembly has a mounting bracket that rigidly secures the end effector to the robotic arm. The gripping assembly has a support bracket that rigidly secures the spindle to the end effector. The compliant assembly joins the mounting assembly to the gripping assembly, and includes an internal collar with two sets of opposed pivot pins that form first and second pivot axes. The biasing assembly includes a sponge rubber biasing ring with a number of uniformly spaced springs that combine to bias the spindle into a normal biased position. The spindle has a reference axis that forms a reference line for the end effector when in this biased position. The collar and biasing ring also have openings that form a part of the passageway. The two-pivot axes allow the spindle to pivot in any direction relative to the reference line through 360° around the reference line. The biasing assembly includes a stiffness adjustment assembly that produces a pre-load condition to adjust the amount of force needed to pivot the spindle out of its normal biased position. As the robotic arm moves the implementing along a uniform path of travel, the tool engages a workpiece with a substantially uniform surface or edge and cuts away unwanted burs or other unintended discontinuities from that surface or edge. However, the tool compliantly pivots relative to the reference line when the tool encounters a desired projection in the workpiece so that the tool does not gouge or cut away that desired projection.

24 Claims, 7 Drawing Sheets

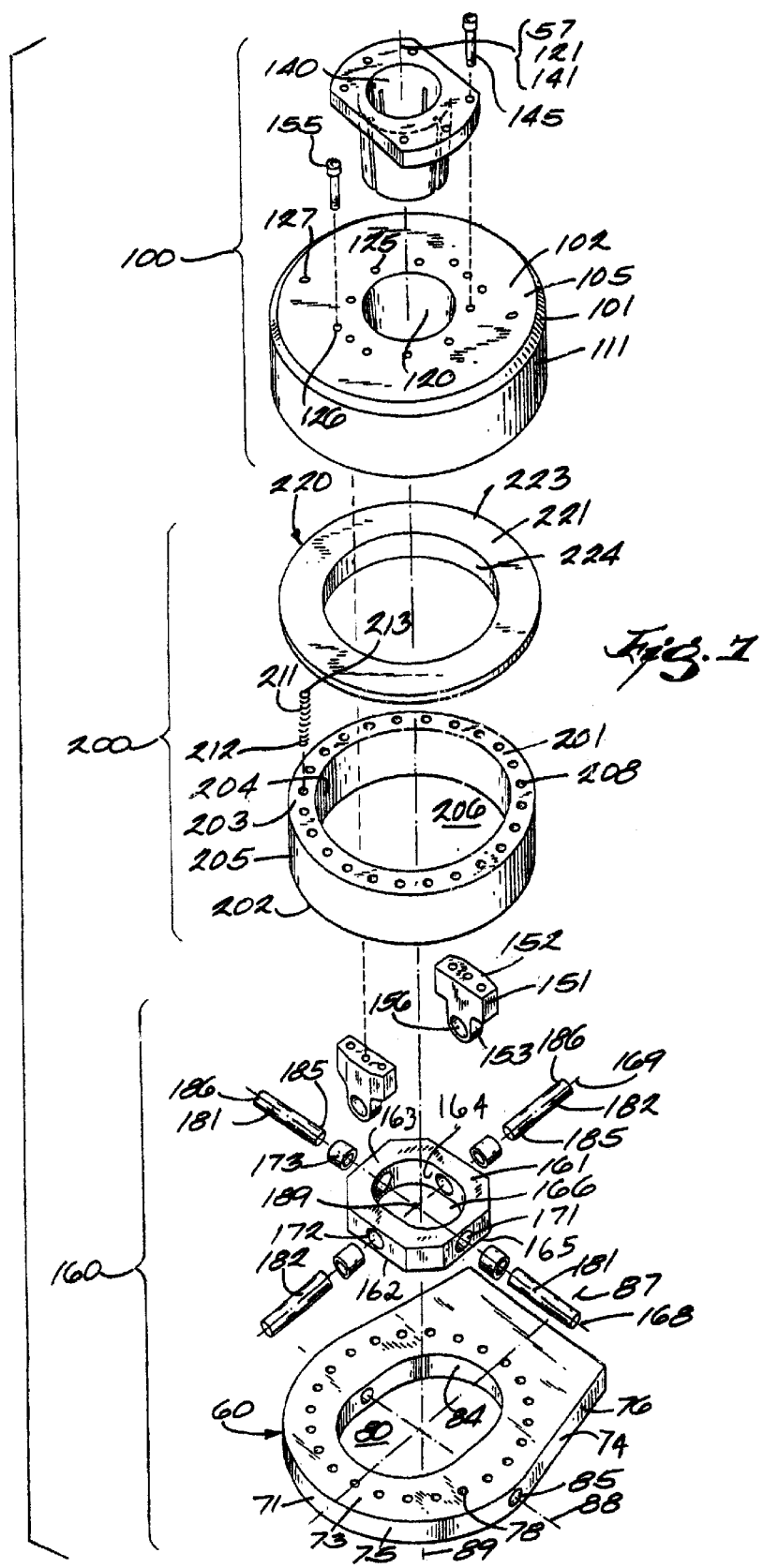

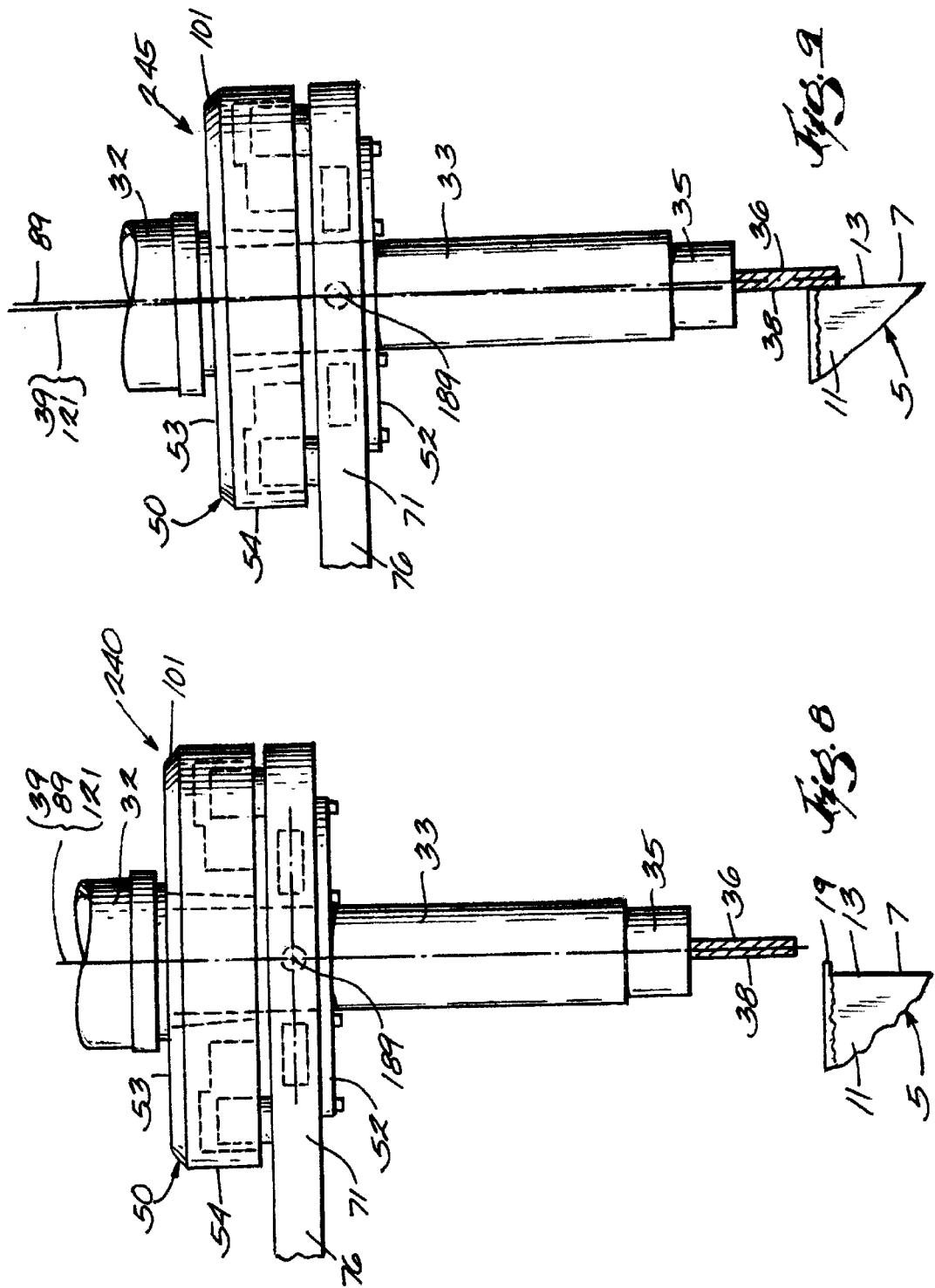

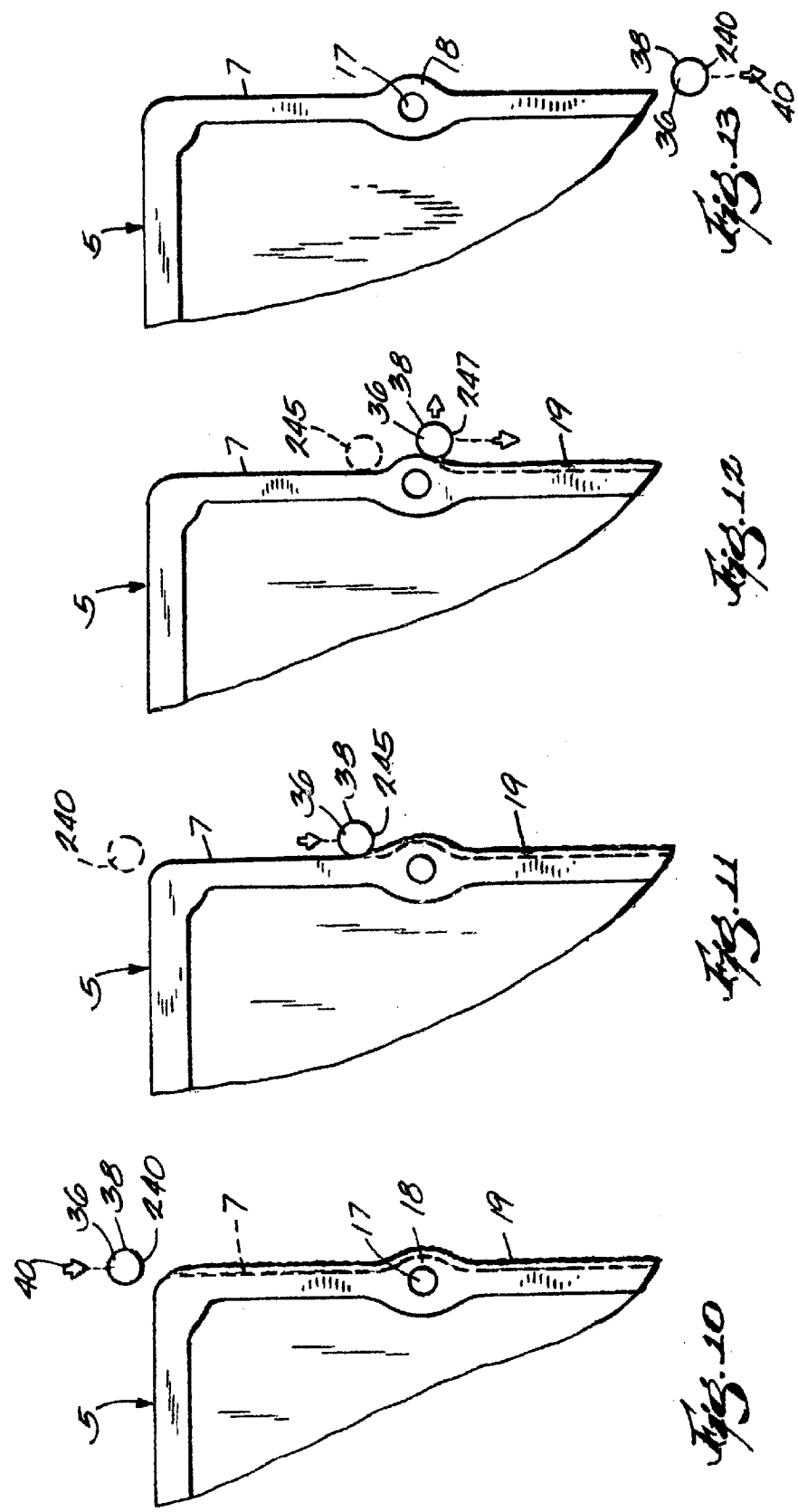

COMPLIANT END EFFECTOR

TECHNICAL FIELD OF THE INVENTION

The present invention relates to a compliant end effector for an industrial robot, and more particularly to an end effector that compliantly holds an implement with a tool and allows the implement to pivot in any direction relative to a given reference line when the tool engages a workpiece in a robotic manufacturing application.

BACKGROUND OF THE INVENTION

Many industries use robotics to speed up manufacturing, improve product quality, reduce costs and provide a safer working environment for employees. Parts are robotically worked by securing them to a work station so that the part is located at specific coordinates. The robot is then programmed to move along predetermined paths of travel, and to rotate, twist and turn at prescribed points along these paths. For each path of travel, the robot is programmed to move between specific points. The path may be linear or have a defined arcuate shape, such as a circle, ellipse, parabola, or portion thereof. A tool secured to the robotic arm performs desired tasks on the part as the robot moves along its path of travel. The robot will follow the programmed path of travel without deviation. The robot performs the same tasks at the same places on each part passing through the work station. Such robotic work stations process parts quickly and manufacture them to relatively high degrees of tolerances.

A problem with robotic manufacturing is that the robots must be programmed to take into account every surface of the workpiece being machined. While the programming process can be fairly easy for parts with relatively simple shapes, programming becomes arduous for more complicated part shapes. Conventional robots and their end effectors do not compensate for small, intended deviations in an otherwise uniform surface of the workpiece. For example, a cast or molded part may have several flat surfaces with small abutments, recesses or screw holes for aligning or joining that part to another part. These abutments and the walls of the screw holes project outwardly from the otherwise uniform, linear or arcuate surface of the workpiece. The robot must be programmed to adjust for each of these deviations or the projection can be ground or cut out of the workpiece. The programmer must account for every intended deviation in the otherwise uniform surfaces of the workpiece, or risk producing a potentially defective product. Writing programs that take into account every intended deviation in a complex part shape is tedious, time consuming, expensive and prone to mistake. Several test runs may have to be performed before the program is ready for production.

Another problem with conventional robotic manufacturing is that the robot will not compensate for any misalignment of the workpiece at the work station. This is particularly problematic when manufacturing large, heavy workpieces, such as a vehicle transmission housing. Such workpieces are difficult to move into a precise orientation and coordinates. The robot will also not compensate for small imperfections in the workpiece, such as any warpage in its surface. The robot will gouge, undercut or miss the workpiece due to any such misalignment or imperfection.

A further problem with robotic manufacturing is that each change in path of the robotic arm can cause imprecision in the finished part due to the tolerances associated with the movements of the robotic arm. Complex parts with a variety of surfaces can be problematic because the robotic arm must travel along many different paths of travel. Small amounts of tolerance can accumulate to produce a significant imprecision in the workpiece.

A still further problem with robotics is that the robotic arms are designed to meet specific industry needs, and thus each arm has specific weight and torque capacities. Should the end effector and implement exceed these limits during use, the robotic arm can malfunction, operate inappropriately, wear out more quickly, or break down. The lighter the end effector and the more balanced it is when holding an implement, the heavier and more powerful the implement that can be held by the robotic arm. Accordingly, end effectors should have a compact, lightweight and balanced design.

A still further problem with robotics is designing an end effector suitable for compliantly matching a variety of differently shaped parts. The end effector must be able to compensate for deviation and misalignments that may arise along any horizontal, vertical, angled, or arcuate path of travel. Conventional end effectors may allow the tool to compliantly engage the workpiece when the end effector and tool are upright, but not when they are turned sideways or upside down. The end effector may become jammed or become to stiff or too lose when turned sideways or upside down. The amount of compliance may also deviate depending on the orientation of the end effector and tool. The workpiece will need to be repositioned one or more times to accommodate the limitation of the end effector. Such an end effector has a greatly reduced value in a commercial manufacturing operation.

A still further problem with conventional compliant end effectors is that it is difficult to easily and securely attach an implement to the end effector. Implements are frequently heavy, bulky and awkward to handle, which can result in misalignments. Workers can also bump or drop the implement, causing damage to the implement or injuring themselves or a coworker.

The present invention is intended to solve these and other problems.

BRIEF DESCRIPTION OF THE INVENTION

The present invention relates to a compliant end effector for securing an implement or tool such as a spindle to an arm of an industrial robot. The end effector has an internal passageway that extends completely through the end effector for receiving the spindle. The end effector includes a mounting assembly, a gripping assembly, a compliant assembly and a biasing assembly. The mounting assembly has a mounting bracket that rigidly secures the end effector to the robotic arm. The gripping assembly has a support bracket that rigidly secures the spindle to the end effector. The compliant assembly joins the mounting assembly to the gripping assembly, and includes an internal collar with two sets of opposed pivot pins that form first and second pivot axes. The biasing assembly includes a sponge rubber biasing ring with a number of uniformly spaced springs that combine to bias the spindle into a normal biased position. The spindle has a reference axis that forms a reference line for the end effector when in this biased position. The collar and biasing ring also have openings that form a part of the passageway. The two pivot axes allow the spindle to pivot in any direction relative to the reference line through 360° around the reference line. The biasing assembly includes a stiffness adjustment assembly that produces a pre-load condition to adjust the amount of force needed to pivot the spindle out of its normal biased position. As the robotic arm moves the implement along a uniform path of travel, the tool engages a workpiece with a substantially uniform surface or edge and cuts away unwanted burs or other unintended discontinuities from that surface or edge. However, the tool compliantly pivots relative to the reference line when the tool encounters a desired projection in the workpiece so that the tool does not gouge or cut away that desired projection.

One advantage of the present compliant end effector invention is its simplicity of use. The robotic arm does not need to be programmed to take into account every intended deviation in the surface of the workpiece. The end effector securely holds the spindle so that the tool will compliantly engage the workpiece as the spindle moves along a uniform path of travel. This dramatically reduces the amount of programming necessary to machine more complicated parts. Casted and molded parts with relatively uniform surfaces with a number of abutments, recesses and screw holes can be easily processed using a robotic arm with the present compliant end effector. By setting the end effector to a desired amount of stiffness, the end effector will engage and ride over the projections formed by these abutments and screw holes. The robot need only be programmed to move in uniform paths corresponding to each of the relatively uniform surfaces of the workpiece. Each intended deviation need not be individually programmed. Accordingly, the time and cost to program of the robotic arm is greatly reduced, particularly for more complex workpieces.

Another advantage of the present compliant end effector invention is its adaptability. The end effector allows the robot to compensate for the slight misalignment of the workpiece at the work station. This is particularly useful when manufacturing large, heavy workpieces, such as a vehicle transmission housing. The compliant end effector can compensate for slight misalignment of the workpiece from its desired orientation. Similarly, the end effector can compensate for small imperfections in the workpiece, such as any warpage in the surface of the workpiece. The robot will not gouge, undercut or miss the workpiece due to such misalignment of imperfection.

A further advantage of the present compliant end effector invention is its precision. Fewer changes in the path of the robotic arm are required for most workpieces. This helps reduce the imprecision in the finished part due to the tolerances associated with the robotic arm. Complex parts with several surfaces can be more easily programed because the robotic arm travels along fewer paths to machine the generally uniform surfaces of the workpiece. A more precise part is produced because fewer movements of the robotic arm are required to complete a job.

A still further advantage of the present compliant end effector invention is its speed. The end effector improves the speed of a robot and reduces the time needed to perform a manufacturing operation. Robots take time to calculate desired paths of travel based on program points entered by the robot programmer. Robots using the compliant end effector need fewer program points to guide the end effector along its intended paths of travel during a machining operation. The reduction in program points speeds up the robots ability to calculate the desired paths of travel, and thus enables the robot to perform a manufacturing operation more quickly. This increased speed is multiplied by every workpiece manufactured.

A still further advantage of the present compliant end effector invention is its stability. The biasing assembly includes a biasing ring that combines with a number of springs to produce a stable biasing mechanism. The biasing ring produces about half the biasing load of the biasing assembly, and the springs 211 produce the remainder of the biasing load. The biasing ring also serves as a damper. Should the spindle or tool experience any chatter or other vibrations during operation. The biasing ring dampens these vibrations so that they do not multiply together and damage the tool or workpiece.

A still further advantage of the present end effector invention is its versatility. The end effector is relatively light in weight so that it can be used with a variety of implements on a variety of robots without exceeding their weight and torque capacities of the robotic arms. The end effector is designed to hold an implement in a compact and balanced manner. The implement passes through the center of the end effector so that a large portion of the weight of the implement extends from the front of the end effector and a large portion of the weight of the tool extends from the rear of the end effector. For example, end effector is capable of holding an industrial spindle having a length of about two feet so that the center of gravity of the end effector and implement is about six inches from the distal end of a robotic arm and substantially in line with the centerline of the robotic arm. The compact nature of the end effector provides the additional benefit of reducing its weight. This compact, light weight and balanced design allows the end effector to be used with a wide range of robotic arms, as well as with heavier and more powerful implements without exceeding the capacity of the robotic arm.

A still further advantage of the present end effector invention is its consistency. The end effector provides a consistent amount of compliance to the tool independent of its orientation. The end effector can be upright, sideways or inverted without significantly changing the amount of compliance provided to the tool. A consistent amount of compliance is provided when the robotic arm moves along different horizontal, vertical, angled, or arcuate paths of travel. Thus, this versatile end effector can be used in a robotic manufacturing process for a wide variety of differently shaped parts. The robotic arm is free to move about the part without repositioning the part each time a different side is machined.

A still further advantage of the present end effector invention is the ease with which an implement can be installed. The implement is simply inserted into the passageway of the end effector so that the rear housing of the implement abuts a gripping collar of the gripping assembly. Once inserted, the worker can let go of the implement as it is now supported by the end effector. Four clamping bolts are then tightened to form a compression fit between the gripping collar and the implement to rigidly secures the implement to the end effector. Accordingly, even heavy, bulky and awkward to handle implements can be secured to the end effector with relative ease.

Other aspects and advantages of the invention will become apparent upon making reference to the specification, claims and drawings.

BRIEF DESCRIPTION OF THE DRAWINGS

FIG. 7 is an exploded view showing the components of the compliant device that form the mounting assembly, gripping assembly, compliant assembly and biasing assembly.

FIG. 8 is a side view showing the compliant device in its normal biased position with the biasing assembly biasing the axis of the implement and tool into linear alignment with a reference line of the end effector.

FIG. 9 is a side view showing the tool of the implement engaging the surface of the workpiece so that the compliant assembly allows the axis of the implement and tool to pivot slightly out of alignment with the reference line of the end effector.

FIG. 10 is a side view showing a linear path of travel of a spindle being held in a normal biased position by the compliant end effector just prior to its tool engaging a surface or edge of a workpiece to be deburred.

FIG. 11 is a side view showing the spindle moving along the same linear path of travel down the length of the workpiece with its tool pivoted slightly out of the normal biased position via the compliant device with the biasing assembly pressing the tool against the workpiece being deburred.

FIG. 12 is a side view showing the spindle moving along the same linear path of travel down the length of the workpiece with its tool pivoted further out of its normal biased position via the compliant device to accommodate a wall of a screw hole in the workpiece.

FIG. 13 is a side view showing the spindle as it completes its linear path of travel along the length of the workpiece after its tool disengages the workpiece and the biasing assembly returns the tool to its normal biased position.

DESCRIPTION OF THE PREFERRED EMBODIMENTS

While this invention is susceptible of embodiment in many different forms, the drawings show and the specification describes in detail a preferred embodiment of the invention. It should be understood that the drawings and specifications are to be considered an exemplification of the principles of the invention. They are not intended to limit the broad aspects of the invention to the embodiment illustrated.

Figure 2:
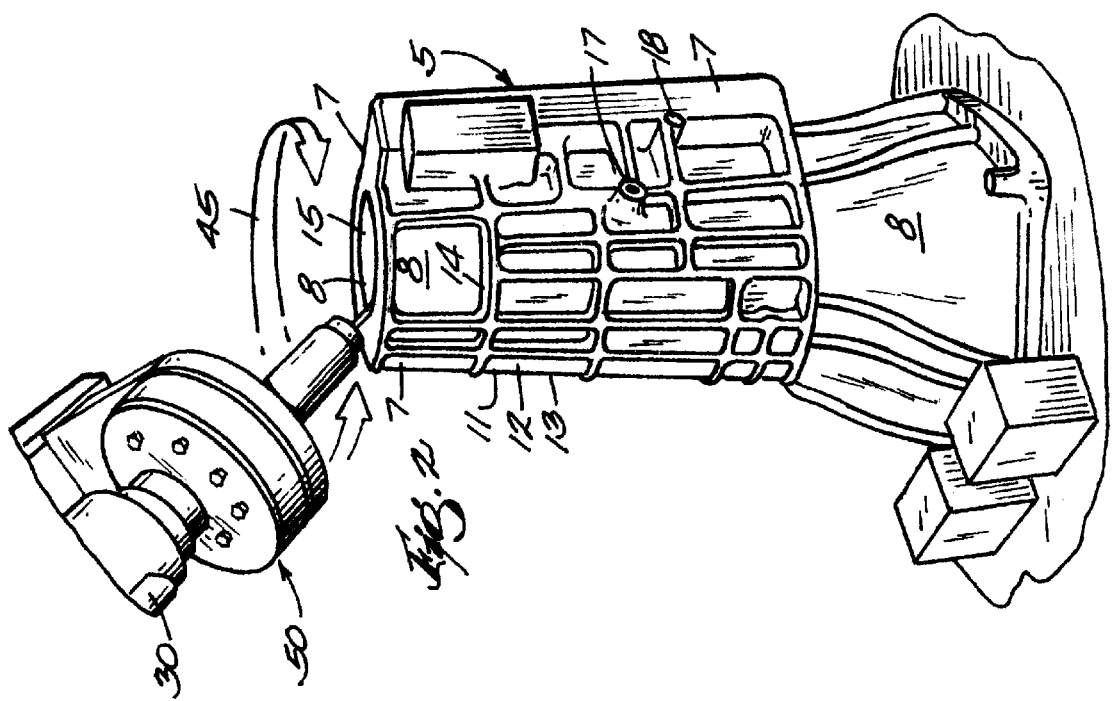
FIG. 2 is a perspective view of the compliant device holding the spindle with its tool deburring a horizontal circular opening of the transmission housing.
Figure 1:
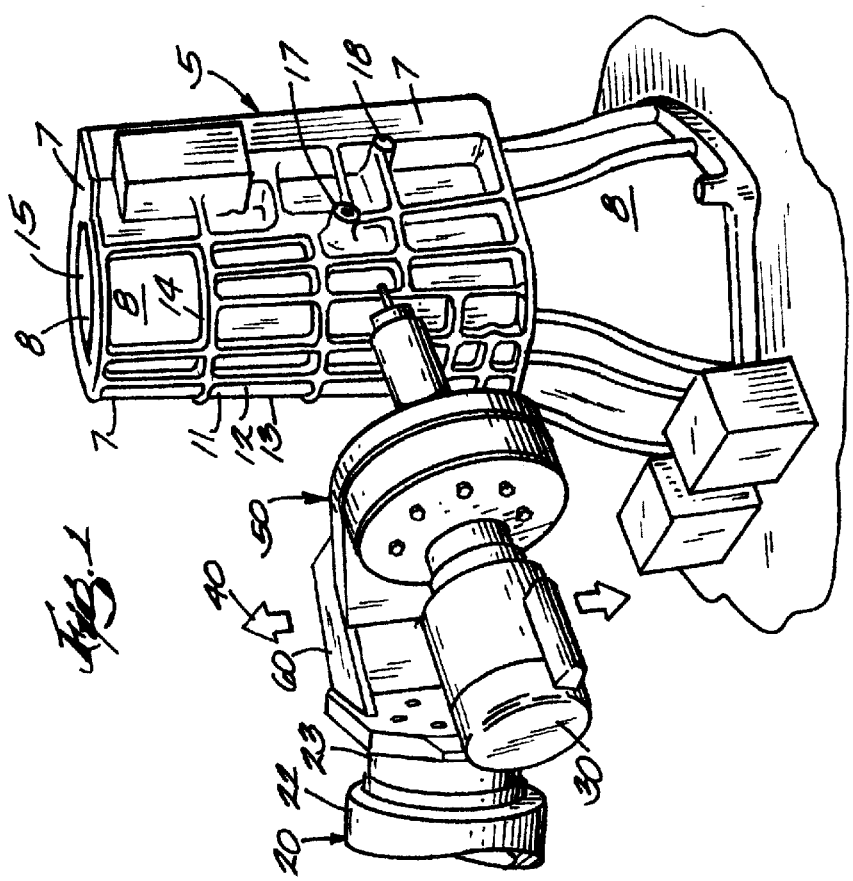
FIG. 1 is a perspective view of the compliant device holding a spindle with its tool deburring one of the vertical webs of a transmission housing.
Figure 3:
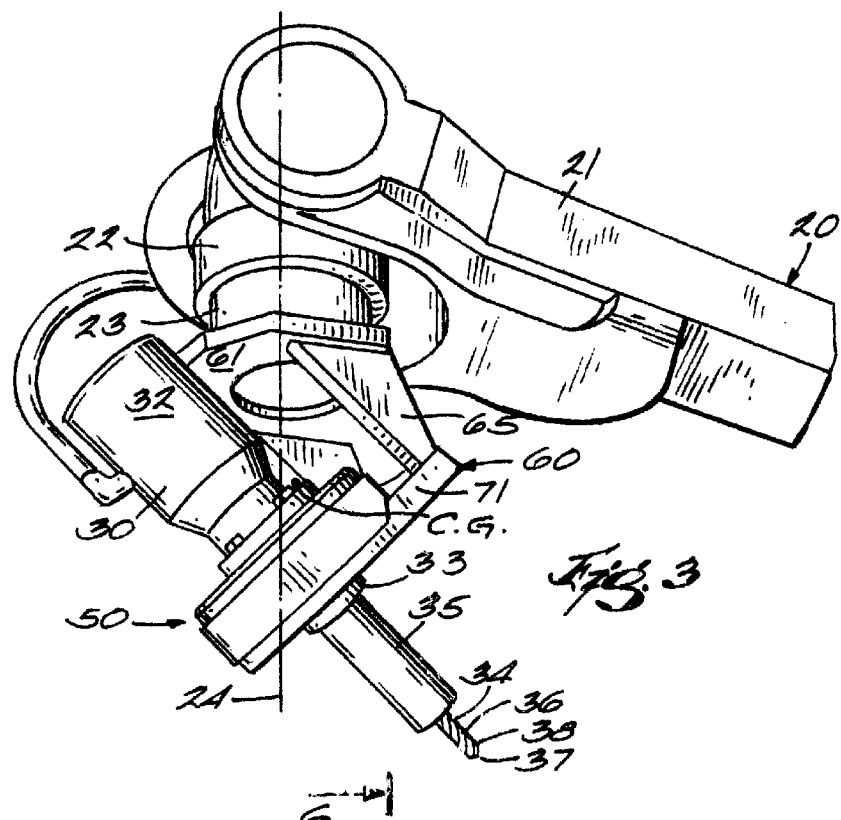
FIG. 3 is a perspective view showing the compliant device with a mounting assembly secured to a robotic arm, and gripping assembly holding a spindle so that a non-rotating sleeve and a rotating shaft of the tool extend through the middle of the device.

FIGS. 1 and 2 show a workpiece 5 in the form of a transmission housing for a vehicle. The main body of the housing 5 has generally a conical shape with a number of generally linear 7 and arcuate 8 surfaces. An array of web-like flanges 11 project outwardly from the main body of the housing 5. The side surfaces 12 of the flanges 11 have a generally flat and linear shape. These side surfaces 12 can be rounded near the intersections of the flange, but tend to be uniform and linear between intersections. The uniform linear shape of these surfaces 7 is suited for robotic machining. The outer end surfaces 13 and edges 14 of the flanges 11 are parallel to the generally conical shape of the housing 5, and are therefore frequently curved or arcuate in shape. The arcuate shapes of these surfaces 8 form uniform circular, parabolic or other mathematically definable shapes that are suited for robotic machining. For example, as best shown in FIG. 2, the narrower end of the housing 5 has an opening 15 with a uniformly circular sidewall surface and edge. Still, a number of bolt holes 17 and other intended features project out from or into the otherwise uniformly linear 7 or uniformly arcuate 8 surfaces of the housing 5. Features such as the walls of these bolt holes 17 form intended discontinuities 18 in the otherwise uniform surfaces 7 and 8 of the housing 5. As the transmission housing 5 is a freshly cast or molded part, the linear 7 and arcuate 8 surfaces contain burs and jagged edges 19 that need to be machined to clean up the housing 5, as shown in FIGS. 10–13.

To robotically machine the fresh molded transmission housing 5, each housing 5 is brought to a workstation and placed at a predetermined location and aligned in a predetermined orientation. The workstation includes a robot 20 for matching the housing 5. The robot 20 can be secured to the floor at a location near the housing 5, or suspended from the ceiling above the housing. The robot 20 includes a multi-segment robotic arm 21 with an outer arm segment 22 that forms a distal end 23 of the robotic arm. The robotic arm 21 is long enough that its distal end 23 can reach all or most surfaces of the housing 5. An implement 30 such as a spindle is secured to the distal end 23 of the robotic arm 21.

The spindle implement 30 has a rear housing 32 and a working end 34. The rear housing 32 includes an electric or pneumatic motor (not shown). Electric or pneumatic power is supplied to the robot 20 to the motor via a power cord or tube. The rear housing 32 has a hollow sleeve 33 that is molded or welded to the housing. The sleeve 33 extends toward the front or working end 34 of the spindle, and has an outside diameter of about 2⅜ inches. A rotating shaft 35 extends from the motor through the hollow sleeve 33. The spindle weighs about twenty-five pounds, produces about 3 horsepower, and operates at 400 to 600 Hertz with a speed of about 24,000 to 600,000 rotations per minute. However, other types of spindles and other types of implements could be used without departing from the broad aspects of the invention.

The rotating shaft 35 is adapted to grip a tool 36 such as a cutter, grinder, sander, drill, or the like. The tool 36 forms the working end 34 of the implement 30. The tool 36 has a tip 37 and side surfaces 38 for engaging the workpiece 5. The shaft 35 and the tool 36 rotate about a central axis 39 of the implement 30. Although the implement 30 is shown and described as a spindle with a shaft 35 and a tool 36 that rotate about its central axis 39, it should be understood that other types of implements without rotating shafts or extensions could be used without departing from the broad aspects of the invention. For these other implements 30, the central axis 39 could take the form of a reference axis or line or a centerline. As shown in FIGS. 1 and 2, the robot 20 is programmed to move the working end 34 and tool 36 of the implement 30 along predetermined linear and arcuate paths of travel 40 and 45 over the surfaces 7–14 of the housing 5 to machine or otherwise perform work on those surfaces.

The invention generally relates to a compliant end effector 50 for an industrial robot 20 of the type shown in FIGS. 3–7. The end effector 50 has a working portion 50 with spaced apart front 52 and rear 53 surfaces, a generally round outer circumference 54 and an interior passageway 55 that combine to give it a somewhat donut-like shape or appearance. The passageway 55 extends completely through the working portion 51 from the front surface 52 to the rear 53 surface. The passageway 55 is tubular in shape and has a centerline 57. The passageway 55 extends through the middle of the working portion 51 so that the centerline 57 of the passageway 55 is also the centerline of its generally circular circumference 54. The end effector 50 weighs about fifty pounds, so that the spindle and end effector have a combined weight of about seventy-five pounds. As discussed below, the end effector 50 includes a mounting assembly 60, gripping assembly 100, compliant assembly 160 and biasing assembly 200.

The mounting assembly 60 is robustly designed to support and carry the weight of the spindle 30 and end effector 50. The mounting assembly 60 has a locking bracket or plate 61 that is bolted or otherwise rigidly secured and locked to the distal end 23 of the robotic arm 21. The locking plate 61 is roughly perpendicular to the centerline 24 of the outer segment 22 of the robotic arm 21. An alignment brace 65 is welded or otherwise rigidly secured to the locking plate 61. The alignment brace 65 extends at an angle of about 45° relative to the locking plate 61 and the centerline 24 of the robotic arm 21. This 45° angle is roughly parallel to the intended direction of the axis 39 of the spindle 30. The brace 65 has a length of about 6¾ inches.

Figure 4:
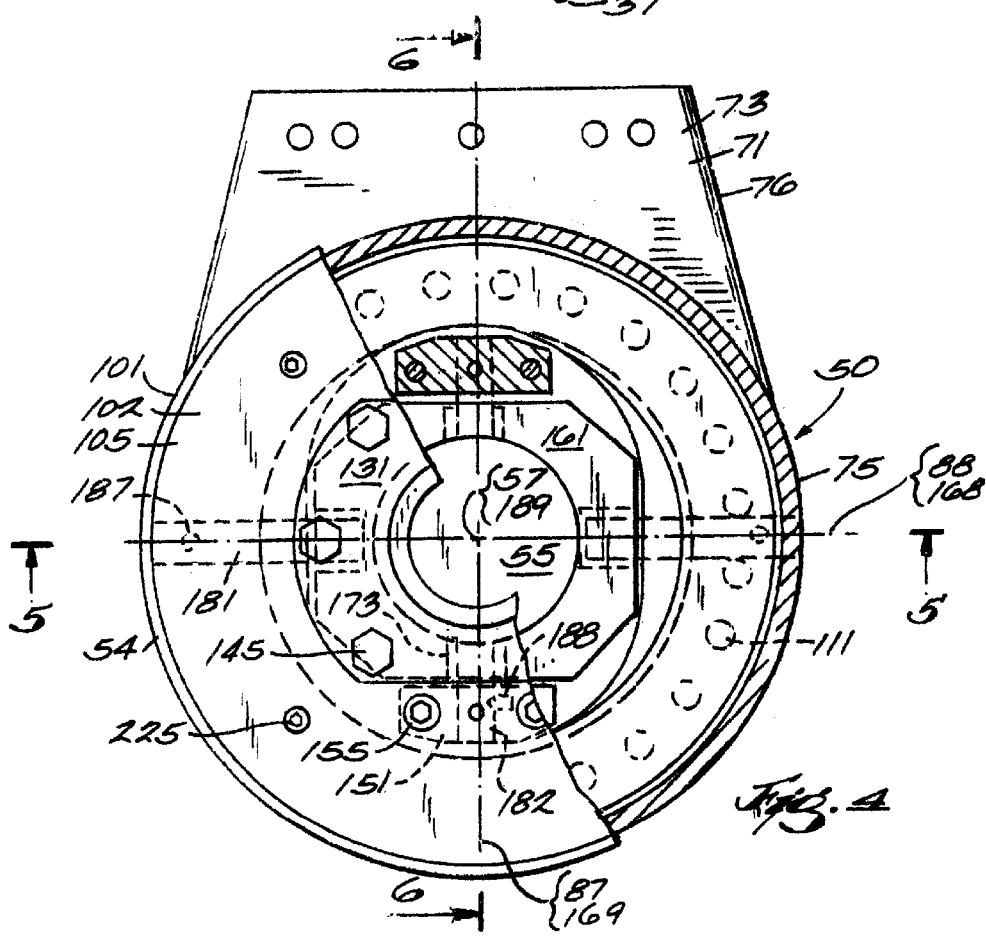
FIG. 4 is a rear, partially cut away view showing the compliant device with the gripping assembly cut away to expose a compliant assembly with an internal pivoting collar and first and second sets of opposed pivoting pins and a biasing assembly with a biasing ring and uniformly spaced springs.

The mounting assembly 60 further includes a mounting bracket 71. The mounting bracket 71 is bolted or otherwise rigidly secured to an end of the alignment brace 65, and thus is also rigidly secured to the distal end 23 of the robotic arm 21. The mounting plate 71 is perpendicular to the alignment brace 65 so that it also forms a 45° angle relative to the centerline 24 of the robotic arm 21. The mounting bracket 71 is robustly designed, and has a generally flat, plate-like shape with parallel, spaced apart front 72 and rear 73 surfaces. The plate 71 also has an outer sidewall surface 74. The plate 71 is preferably about ten inches long, eight inches wide and one inch thick. As best shown in FIGS. 4 and 7, one portion 75 of the mounting plate 71 has an outer sidewall surface 74 that is circular in shape and generally flush with the outer circumference 54 of the end effector 50. Another portion 76 of the mounting plate 71 extends outwardly from the circumference 54 of the end effector 50. This portion 76 spaces the spindle 30 and the working portion 51 of the end effector 50 from the locking plate 61 and brace 65. This portion 76 has three bolt holes and two dowel holes near its outer end for removably bolting or otherwise rigidly securing the mounting plate 71 to the brace 65. The rear or interior surface 73 of the mounting plate 71 is provided with a number of uniformly spaced holes 78 that extend into but do not pass through the plate.

The mounting plate 71 has an oval shaped opening 80 that passes completely through the plate from its front surface 72 to its rear surface 73. This opening 80 is formed by an inner sidewall 84. This inner sidewall 84 has a set of diametrically opposed holes 85 that extend into the mounting plate 71. These holes 85 share a common centerline. The oval opening 80 is about six inches long and four inches wide measured across its perpendicular major 87 and minor 88 axes, respectively. The centerline of the holes 85 is inline with the minor axis 88 of the oval opening 80.

The opening 80 has a centerline 89 that passes through a point of intersection of its major and minor axes 87 and 88. This centerline 89 is also perpendicular to the front 72 and rear 73 surfaces of the plate 71. The centerline 89 of the opening 80 is six inches from and parallel to the brace 65 so that it extends at a 45° angle to the centerline 24 of the robotic arm 22. The opening 80 is formed in a middle portion of the mounting plate 71 so that its centerline 89 is generally inline with the centerline 57 of the passage 55. The centerline 89 forms a reference line for the robot 20. As discussed below, the robot 20 presumes the axis 89 of the spindle 30 and the tool 36 is inline with this reference line 89. Although the reference line 89 is shown and described as being inline with the centerline of the opening 80, it should be understood that the reference line could be taken along another line of reference without departing from the broad aspects of the invention.

The gripping assembly 100 is robustly designed to rigidly grip and carry the weight of the spindle implement 30. The gripping assembly 100 has a bowl-shaped support bracket 101 with an open middle. The bracket 101 includes a radial section in the form of a plate 102 with front 104 and rear 105 surfaces. The plate 102 has a diameter of about eight inches. The rear or outer surface 105 is flat. The front or interior surface 104 is stepped to that the plate 102 is thicker towards its middle and thinner towards its outer circumference. The bracket 101 has outer 111 and inner 116 rims that extend perpendicularly from the inner and outer ends of the plate 102, respectively. The rims 111 and 116 are perpendicular to the plate 102 and extend toward the mounting bracket 71 a distance of about 1¾ inches. The outer rim 111 has inner 112 and outer 113 surfaces and a distal end 114. The outer surface 113 is flush with the outer circumference 54 of the end effector 50.

Figure 5:
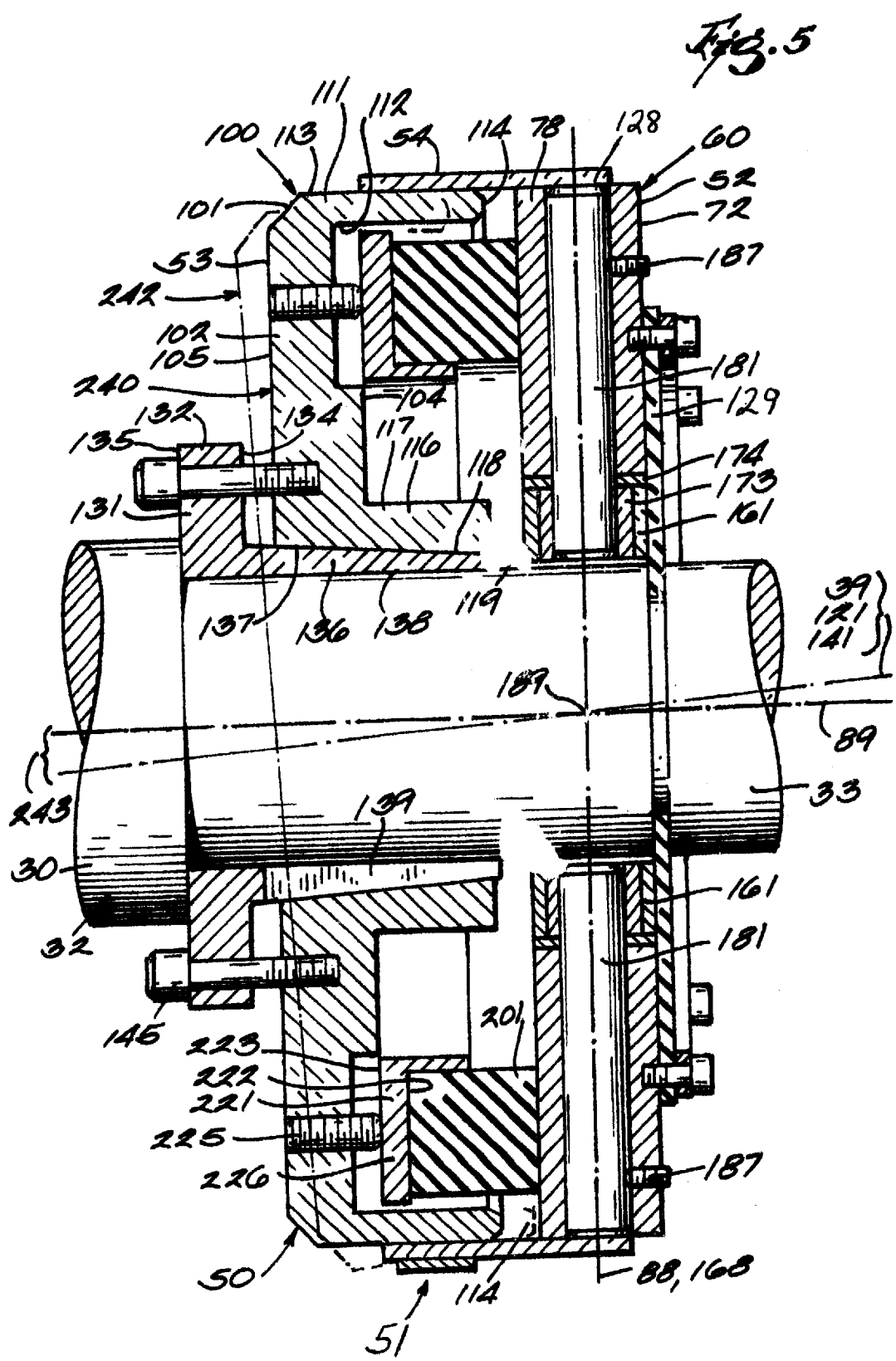
FIG. 5 is a sectional view of FIG. 4 taken along line 5-5 showing the mounting assembly, the gripping assembly with inwardly extending stanchions and the internal compliant assembly with an internal pivoting collar, the opposed stanchions being pivotally joined to the internal pivoting collar by the second set of opposed pivot pins.
Figure 6:
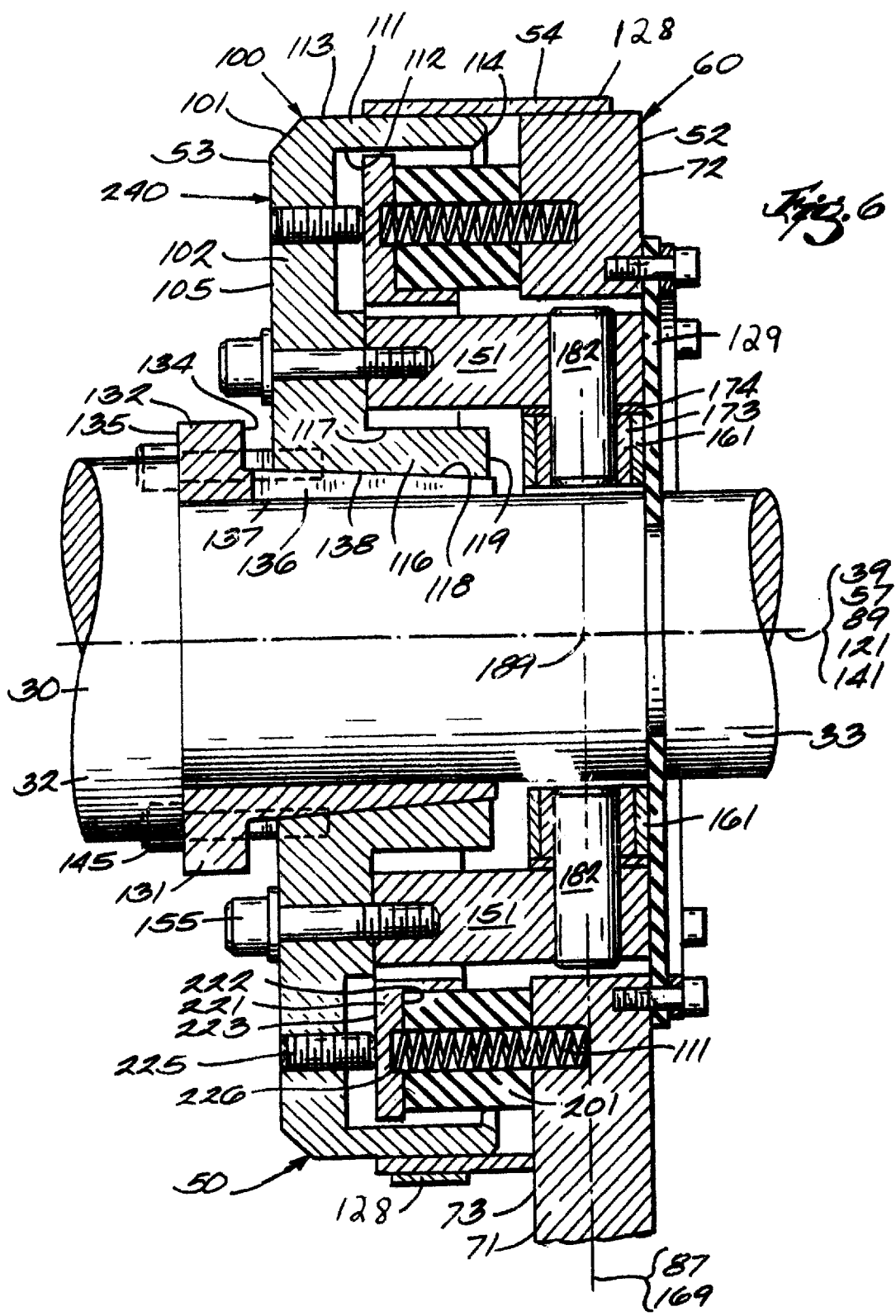
FIG. 6 is a sectional view of FIG. 4 taken along the line 6-6 showing the mounting assembly with a mounting bracket, gripping assembly and internal compliant assembly with the internal pivoting collar, the mounting bracket being pivotally joined to the internal collar by the first set of opposed pivot pins.

The inner rim 116 of the support bracket 101 is robustly sized to maintain its shape under pressure. The inner rim 116 has inner 117 and outer 118 surfaces and a distal end 119. The outer surface 118 forms an interior channel 120 with a centerline 121 perpendicular to the rear surface 105 of the support bracket 101 and generally aligned with the centerline 89 of the oval opening 80 of the mounting plate 71. As best shown in FIGS. 5 and 6, the outside surface 118 is sloped at a slight angle so that the channel 120 narrows as it extends from the rear surface 105 to the distal end 119. The channel 120 has a circular cross-sectional shape with a diameter of about 2⅞ inches at the rear surface 105 and 2⅝ inches at the distal end 119.

As best shown in FIGS. 5–7, the annular plate 102 has a number of clamping holes 125, bolt holes 126 and screw holes 127. The clamping holes 125 are located near the inner rim 116 and extend into but do not pass through the plate 102. The bolt holes 126 are also located near the inner rim 116, but pass completely through the plate 102. The screw holes 127 located nearer the outer rim 111 also pass completely through the plate 102. The clamping holes 125 and screw holes 127 are threaded. Seals 128 and 129 are used to keep dirt and debris out of the inside of the end effector 50. One seal 128 is wrapped around the outer circumference 54 of the end effector 50 to cover the gap between the mounting and support brackets 71 and 101. Another seal 129 is secured to the front surface 52 of the end effector 50 to cover the gap between the sleeve 33 of the spindle 30 and the inner side wall 84 of the mounting plate 71.

The gripping assembly 100 has a gripping collar 131 that forms a rigid, compression fit grip around the sleeve 33 of the spindle 30. The gripping collar 131 is formed by a thick annular flange 132 with front 134 and rear 135 surfaces that are generally parallel to the rear surface 105 of the support bracket 101. The collar 131 includes a relatively thin, inner sleeve 136 with a length of about 2⅓ inches. The sleeve 136 has inner 137 and outer 138 surfaces, and a number of slots 139 that extend down the length of the sleeve 136 to facilitate its deformation. The sleeve 136 forms a central channel 140 that extend completely through the collar 131. When the sleeve 136 is in an uncompressed or relaxed state, the channel has a circular cross-sectional shape with a continuous diameter of 2⅜ inches. The inner surface 137 is perpendicular to the rear surface 105 of the support bracket 101, so that the support bracket 101 and collar 131 share a common centerline 121. This common centerline 121 is normally inline with the reference line 89 of the end effector 50, but may pivot out of alignment as discussed below. The outer surface 138 of the sleeve 136 is sloped at a slight angle parallel to that of the outer surface 118 of the inner rim 116 of the support bracket 101, so that the two surfaces flushly engage each other.

The flange 132 of the gripping collar 131 includes several holes that pass completely through the flange. These holes are aligned with the clamping holes 125 of the support bracket 101. One clamping bolt 145 extends completely through each hole in the flange 132 and partially into a corresponding clamping hole 125 in the support bracket 101. The heads of the bolts 145 press against the rear surface 135 of the flange 132. The shank of the bolts 145 threadably engage the clamping holes 125 to rigidly secure the collar 131 to the support bracket 101. The sleeve 136 of the collar 131 remains in an uncompressed state at this point. The sleeve 33 of the spindle 30 is then inserted into the channel 140 of the collar 131 until a rim of the rear housing 32 engages the rear surface 135 of the collar 131. The diameter of the sleeve 33 of the spindle 30 is slightly smaller than the diameter of the channel 140 formed by the gripping collar 131 so that the spindle will easily slide into the collar.

The spindle 30 is rigidly secured to the gripping collar 131 by tightening the clamping bolts 145 as shown in FIGS. 5 and 6. When tightened, the bolts 145 move further down into the holes 125 of the support bracket 101. As the heads of the bolts 145 already engage the rear surface 135 of the collar 131, the downward movement of the bolts wedges the sleeve 136 of the collar 131 down into the narrowing channel 120 formed by the rim 116 of the support bracket 101. This wedging action reduces the inside diameter of the sleeve 136, and compresses the sleeve 136 around the sleeve 33 of the spindle 30 so that the spindle is rigidly secured to the collar 131. The sleeve 33 of the spindle 30 can also be slightly compressed to further improve the gripping strength of the collar 131. The bolts 145 are tightened until the collar rigidly grips the sleeve 33 of the spindle 30. When the spindle 30 is rigidly secured to the gripping assembly 100, the central axis 39 of the spindle 30 is inline with the common centerline 121 of the collar 131 and support bracket 101. The spindle 30 can be removed by loosening the bolts 145 so that the sleeve 136 of the collar 131 can slide up the channel 120 of the support bracket 101. Although the gripping assembly 100 is shown and described to include gripping collar 131, it should be understood that the gripping assembly could use other mechanisms to rigidly secure the spindle 30 or a different implement. For example, the spindle 30 could be bolted or otherwise secured directly to the support plate 101.

The gripping assembly 100 further includes a pair of spaced apart stanchions 151 having first and second ends 152 and 153. Each stanchion 151 is robustly sized to carry the weight of the gripping assembly 100 and spindle 30. Each stanchion 151 is a mirror image of the other. The first end 152 of each stanchion 151 is rigidly bolted to the front or interior surface 104 of the support bracket 101 via bolts 155. The stanchions 151 are located on diametrically opposite sides of the channel 120 near the inner rim 116. The second end 153 of each stanchion 151 has a hole 156 passing from one side of the stanchion to the other. The stanchions 151 are aligned on the support bracket 101 so that the centerline of each hole 156 is inline with the other. The centerline of the holes 156 intersects and is perpendicular to the centerline 121 of the gripping assembly 100.

The stanchions 151 are about 2¼ inches in length. The centerline of each hole 156 is about 1¾ inches from the rear end of each stanchion 151 to properly space the gripping assembly 100 from the mounting assembly 60. As discussed below, the interior surface 104 of the support bracket 101 is spaced from the interior surface 73 of the mounting bracket to accommodate the compliant assembly 160 and the biasing assembly 200. As also discussed below, the distal ends 114 and 119 of the outer and inner rims 111 and 116 are also spaced from the surface 73 of the mounting bracket 71 to allow the gripping assembly 100 to pivot relative to the mounting assembly 60.

The compliant assembly 160 allows the gripping assembly 100 to pivot relative to the mounting assembly 60. The compliant assembly 160 includes a robustly designed collar 161 with front 162, near 163, inner 164 and outer 165 surfaces. The collar is about 4½ inches long, 3¾ inches wide and 1 inch thick. The inner surface 164 forms an oval shaped opening 166. The opening 166 is about 2⅞ inches long and 2⅜ inches wide along its perpendicular major 168 and minor 169 axes, respectively. The collar 161 is positioned inside the oval opening 80 of the mounting plate 71. The collar 161 is aligned so that the major axis 168 of its opening 166 is inline with the minor axis of the opening 80 of the mounting plate 71. Similarly, the minor axis 169 of the opening 166 is inline with the major axis of the opening 80 of the mounting plate 71.

As best shown in FIG. 7, the collar 161 has two sets of opposed holes 171 and 172. Each hole extends completely through the collar 161 from the inner surface 164 to the outer surface 165. The first set of holes 171 is located on diametrically opposite sides of the collar 161 so that their centerline is inline with the major axis 168 of the collar. The second set of holes 172 is located on diametrically opposite sides of the collar 161 so that their centerline is inline with the minor axis 169 of the collar. Each hole 171 and 172 is fitted with a ring shaped roller bearing 173. Each bearing has an inner and an outer surface and end walls. The outside wall of each bearing 173 is snuggly and firmly received into its respective hole 171 and 172. The inside wall of each bearing 173 forms a hole that is coaxial to its respective hole 171 or 172. The ends of the bearings 173 are flush with the inner and outer surfaces 164 and 165 of the collar 161. A thrust washer 174 is placed between the end of each bearing 173 and the mounting plate 171 for pins 181. A thrust washer is placed between the end of each bearing 173 and the stanchion 161 for pins 182.

Each set of holes 171 and 172 in the collar 161 has an associate set of pivot pins 181 or 182. Each set 181 and 182 includes two pivot pins. Each pivot pin 181 or 182 is diametrically opposed to and has a central axis that is inline with its associated hole 171 or 172 and opposed pivot pin. Each pivot pin 181 or 182 has an inside end 185 and an outside end 186. The inside end 185 is firmly received by the bearing 173 of its respective hole 171 or 172. The bearings 173 allow each pin 181 or 182 to rotate axially about its central axis. The central axis of the first set of pivot pins 181 forms a first pivot axis that is inline with the major axis 168 of the oval opening 166 of the collar 161. The central axis of the second set of pivot pins 182 forms a second pivot axis that is inline with the minor axis 169 of the oval opening 166. The outside end 186 of each pin in the first set of pivot pins 181 is received by and rigidly fixed in one of the diametrically opposed holes 85 of the mounting plate 71 by a set screw 187 shown in FIG. 4. The outside end 186 of each pin in the second set of pivot pins 182 is received by and rigidly fixed in one of the holes 156 of the stanchions 151 by a set screw 188. The pivot axis 168 and 169 cross at the middle or pivot point 189 of the oval opening of the collar 161. The pivot point 189 lies on both the centerlines 39 and 121 of the spindle 30 and gripping assembly 100 and the reference line 89 of the end effector 50.

The collar 161 is free to pivot about the mounting bracket 71 via the first pivot axis 168 formed by the first set of pivot pins 181. The gripping assembly 100 is free to pivot about the collar 161 via the second pivot axis 169 formed by the second set of pivot pins 182. This double pivot axes design allows the central axis 39 of the spindle 30 and the common centerline 121 of the gripping device 100 to pivot out of alignment with the reference line or centerline 89 of the opening 80 of the mounting assembly 60. The axis 39 of the spindle 30 is free to pivot in any direction through 360° about the reference line 89. As noted above, during use, the robot 20 presumes that the axis 39 of the spindle 30 and its tool 36 is inline with the reference line 89 even when the axis 39 of the spindle pivots out of alignment with this reference line so that the tool moves to the side of the reference line.

The biasing assembly 200 biases the central axis 39 of the spindle 30 into linear alignment with the reference line or centerline 89 of the mounting assembly 60. The biasing assembly includes a circular biasing ring 201 made of a natural sponge rubber having a hardness of about 60 to 80 durometers. The ring 201 has an outside diameter of about 7¾ inches and an inside diameter of about 5¾ inches. The ring 201 has a rectangular cross-sectional area with a height of about 1½ inches between its front 202 and rear 203 surfaces, and a width of about one inch between its inner 204 and outer 205 side surfaces. The inner side surface 204 forms an opening 206 with a center that falls on the reference line 89 of the end effector 50 as well as the common centerline 121 of the gripping assembly 100 when in its normal biased position. The biasing ring 201 has twenty-four uniformly spaced, linear holes 208 that pass completely through the ring from its front surface 202 to its rear surface 203. Each hole 208 has a diameter of about 7/16 inch.

Each hole 208 in the biasing ring 201 is sized to receive a die spring 211 having a free length of about 1¾ inches between its front 212 and rear 213 ends. Each spring is spaced the same distance from the reference or centerline 89 of the end effector 50 or the centerline 121 of the gripping assembly 100. The springs 211 are preferably cylindrical helical springs with a circular cross section. Each spring 211 preferably produces 3.4 pounds of first per ten percent of deflection, and have a maximum deflection of ⅞ inch. The front surface 202 of the resilient ring 201 rests or presses against the rear surface 73 of the mounting plate 71. The front end 212 of each spring 211 is received by one of the holes 78 in the rear surface 73 of the mounting plate 71, and rests on or presses against the bottom of that hole.

Biasing ring 201 combines with the springs 211 to produce a stable biasing assembly 200. The biasing ring 201 produces about half the biasing pressure of the biasing assembly 200 when it is compressed between the mounting and gripping assemblies 60 and 100. The springs 211 produce the remainder of the biasing pressure. The biasing ring 201 also serves as a damper. Should the spindle 30 or tool 36 experience any chatter or other vibrations during operation, the biasing ring 201 dampens these vibrations so that they do not multiply together and damage the tool 36 or workpiece 5.

The biasing assembly 200 includes a stiffness adjustment or pre-load assembly 220. This assembly 220 has a washer shaped, cover 221 with front 222 and rear 223 surfaces and an inner lip 224. The assembly 220 also includes a set of at least three and preferably four adjustment screws 225. The inner lip 224 forms an opening with a center that falls on the centerline 121 of the gripping assembly 100. As best shown in FIGS. 5 and 6, the inner lip 224 has a diameter sized to snugly engage the inner surface 204 of the biasing ring 201. The front surface 222 of the adjustment plate 221 engages and covers the rear surface 203 of the biasing ring 201. The front surface 222 is provided with twenty-four uniformly spaced recesses 226 that extend into but do not pass through the cover. Each recess has a diameter of about 7/16 inch. These recesses 226 are aligned with the holes 78 and 208 of the mounting plate 71 and biasing ring 201, respectively. The rear end 213 of each spring 211 rests on or presses against the bottom of its corresponding recess 226. The adjustment screws 225 are received by the threaded holes 127 of the support plate 102, and are accessible from the rear surface 105 of the support plate. Each adjustment screw 225 has an end that engages the rear surface 223 of the cover 221. The opposite end of each screw 225 has a hex shaped slot for rotating the screw to adjust it towards or away from the cover 221.

As shown in FIGS. 6 and 8, the biasing assembly 200 biases the gripping assembly 160 and the spindle 30 into a normal biased position 240. The normal biased position 240 is the position the end effector 50 takes when no outside force or load is applied to the end effector. In the normal biased position 240, the centerlines 39 and 121 of the tool 36, spindle 30 and gripping assembly 100 are linearly aligned with the reference line 89 of the end effector 50. In this manner, the line of centerline or axis 39 of the spindle forms the reference line 89 of the end effector when in the normal biased position 240. In the preferred embodiment, the centerline 57 of the passageway 55 and the centerline 121 of the gripping assembly 100 are also linearly aligned with the reference line 89, and the reference line is the centerline of the opening 80 of the mounting plate 71.

The biasing assembly 200 provides a uniform load or pressure equidistantly around the reference line 89 and centerline 121 to the mounting 60 and gripping 100 assemblies to achieve the linear alignment of the axis 39 with the reference line 89 when in the biased position 240. The uniform pressure applied by the biasing assembly 200 in equal and opposite directions to the mounting plate 71 and support plate 102 causes the gripping assembly to pivot about pivot point 189 so that the centerline 121 of the gripping assembly is linearly aligned with the centerline line 89 of the mounting plate 71. The uniform pressure applied by the biasing assembly 200 also causes the support plate 102 to align parallel to the mounting plate 71 so that the biasing assembly is compressed a uniform amount around the reference line 89 and the centerline 121.

As shown in FIGS. 5 and 9, the spindle 30 and gripping assembly 100 can pivot in any direction through 360° of rotation about pivot point 189. Once pivoted, the centerlines 39 and 121 of the spindle 30 and gripping assembly 100 are no longer in linear alignment with the reference line 89. The centerlines 39 and 121 can pivot in any direction up to a maximum pivot position 242 of about 3½ degrees from the reference line 89 as shown in FIG. 5. After accommodating this 3½ degree range of pivot positions 243, the distal end 114 of the outer rim 111 of the support plate 101 contacts or bottoms out against the rear surface of the mounting plate 71. In the preferred embodiment, the length of the sleeve 33 of the spindle 30 spaces the tool 36 about 6 inches from the pivot point 189 so that a 3½ degree pivot accommodates a 0.4 inch sideways displacement of the tool. This displacement occurs when the robot positions the tool 36 so that its side 38 presses against a workpiece 5. The workpiece 5 produces a sideward load on the tool 36 that causes the spindle 30 to pivot out of linear alignment with the reference line 89 of the end effector 50. The biasing assembly 200 produces an equal and opposite force pushing to tool into engagement with the workpiece 5.

The stiffness adjustment assembly 220 adjusts the amount of pre-load applied by the biasing assembly 200 to the gripping assembly 100. The pre-load is the uniform pressure applied by biasing assembly 200 to the gripping assembly 100 when the biasing assembly is uniformly compressed around its centerline 121. As noted above, the pre-load tends to maintain the centerline 39 of the spindle 30 in linear alignment with the reference line 89 of the end effector 50. When the adjustment screws 225 are retracted backwards into the holes 127 of the support bracket 101 so that the rear surface 223 of the cover abuts the front or inner surface 104 of the support bracket, the biasing assembly 200 provides a small predetermined amount of pre-load to the gripping assembly 100. This small amount of pre-load is enough to support the weight of the spindle 30 and gripping assembly 100 and keep the axis 39 of the spindle in substantially linear alignment with the reference line 89 of the workpiece when the robot 20 holds the spindle at different angles relative to the ground, and further resist the inertia of the spindle 30 and gripping assembly 100 when the robot twists and turns, or accelerates or decelerates to or from a high rate of speed. Any significant load applied by the workpiece 5 to the side 38 of the tool 36 will cause the axis 39 of the spindle 30 to pivot out of linear alignment with the reference line 89.

When the adjustment screws 225 are extended into the inner cavity of the end effector 50 as in FIGS. 5 and 6, they push the cover 221 forward to compress the biasing ring 201 and springs 211 into a more substantial pre-load condition. In this pre-load position, the biasing assembly 200 provides a significant amount of uniform pressure around the gripping assembly 100. This pre-load is enough to keep the axis 39 of the spindle 30 in linear alignment with the reference line 89, and plates 71 and 102 in parallel alignment, until a predetermined amount of force is applied to the side surface 38 of the tool 36. When this predetermined amount of force is present, the axis 39 of the spindle 30 pivots out of linear alignment with the reference line 89. The pre-load is set so that a bur forming an unintended discontinuity 19 will not produce sufficient force on the side 38 of the tool 36 to overcome the pre-load so that the bur will be cut away. On the other hand, the pre-load is set so that a thick portion of metal forming an intended discontinuity 18 will produce sufficient force on the side 38 of the tool 36 to overcome the pre-load and pivot the tool so that it does not gouge into the intended discontinuity. Pre-loads of about five to fifty pounds can be achieved by the stiffness adjustment assembly 220 for this purpose. When the adjustment screws 225 are advanced all the way forward, the biasing assembly 200 will become so rigid that no pivoting movement or compliance is permitted.

As shown in FIGS. 1, 2 and 10–13, the robot 20 is programmed to move the tool 36 of the spindle 30 along a uniform linear 40 or uniform arcuate 45 path of travel. As shown in FIGS. 10–13, the robot 20 is generally programmed to align the side surface 38 of the tool 36 slightly below a given surface 7–14 of the workpiece 5 so that the axis 39 of the spindle 30 will pivot slightly out of alignment with the reference line 89 and into a pressure position 245 as the tool engages and moves along the uniform surface of the workpiece 5. This pivoting creates a sideward load via the biasing assembly 100 that maintains the tool in contact with the workpiece. The pre-load also helps maintain the tool 36 in engagement with the workpiece 5 as the tool moves along its uniform path of travel 40 or 45 and removes any unintended burs 19 from the surface of the workpiece 5. The axis 39 of the spindle 30 pivots further out of alignment with the reference line 89 or into a discontinuity absorbing position 247 when the tool passes over an intended discontinuity 18 such as the wall of a bolt hole 17. As noted above, the pre-load is set via the adjustment screws 225 so that the tool 36 will not gouge into the wall 18 of the bolt hole 17. The pre-load is also set to keep the tool 36 in contact with the surface 7–14 of the workpiece 5 as the tool passes over the discontinuity 18 at a high rate of speed. Although the intended discontinuity 18 has been shown and described to project out from the otherwise uniform surface 7 or 8 of the workpiece 5, it should be understood that the intended discontinuity could be a recess or notch that projects into the uniform surface of the workpiece without departing from the broad aspects of the invention.

While the invention has been described with reference to a preferred embodiment, it will be understood by those skilled in the art that various changes may be made and equivalents may be substituted without departing from the broader aspects of the invention.

We claim:

1. A compliant end effector for securing an implement to a robot with a robotic arm, the implement having a reference axis and a tool for performing work on a workpiece, the compliant end effector comprising:

a mounting assembly including a mounting bracket that forms an opening, said mounting bracket being rigidly secured to the robotic arm;

a gripping assembly including a support bracket, the implement being rigidly secured to said support bracket;

a biasing assembly that biases the implement and gripping assembly into a biased position, the reference axis of the implement forming a reference line when in said biased position; and, a compliant assembly for joining said mounting and gripping assemblies, said compliant assembly including a collar that forms an opening, said opening of said collar being aligned with said opening of said mounting bracket, the implement passing through said openings of said collar and said mounting bracket, said collar being pivotally connected to said mounting assembly via a first connection permitting said collar to pivot about a first pivot axis relative to said mounting assembly, and said collar being pivotally connected to said gripping assembly via a second connection permitting said gripping assembly to pivot about a second pivot axis relative to said collar, said compliant assembly allowing the implement and said gripping assembly to pivot out of said biased position and allowing the implement and its tool to pivot about said reference line.

2. The compliant end effector of claim 1, and wherein said first pivot axis is substantially perpendicular to and intersects said second pivot axis, and said compliant assembly allows the implement and its tool to pivot out of said biased position in any direction through 360° of rotation about said reference line.

3. The compliant end effector of claim 2, and wherein said first pivot axis is substantially perpendicular to and intersects said second pivot axis to form a pivot point, and the reference axis of the implement pivots about said pivot point.

4. The compliant end effector of claim 3, and wherein said opening of said mounting bracket has a centerline that passes through said pivot point, and the reference axis of the implement is linearly aligned with said centerline when in said biased position.

5. The compliant end effector of claim 3, and wherein said first connection is formed by a first pair of opposed pivot pins, and said second connection is formed by a second pair of opposed pivot pins, said first and second sets of pivot pins extending from said collar, and said first and second pivot axes pass through said pivot pins.

6. The compliant end effector of claim 3, and wherein a first pair of pivot pins are held by said mounting bracket, and said collar is adapted to fit inside said opening of said mounting bracket.

7. The compliant end effector of claim 6, and wherein the implement is a spindle with a rotating shaft, and said reference line is defined by said rotating shaft when in said biased position.

8. The compliant end effector of claim 7, and wherein said mounting bracket is a mounting plate with upper and lower surfaces, and said first pivot axis of said first connection extends substantially parallel to either of said upper and lower surfaces.

9. The compliant end effector of claim 5, and wherein said gripping assembly is spaced from said collar and said mounting assembly via a pair of stanchions, each of said stanchions being rigidly secured to said gripping assembly, and each of said stanchions being pivotally supported by one of said second pair of pivot pins.

10. The compliant end effector of claim 1, and wherein said support bracket has an opening aligned with said openings of said mounting bracket and said collar to form a passageway, and the implement is positioned to pass completely through said passageway.

11. A compliant end effector for securing an implement to a robot with a robotic arm, the implement having a reference axis and a tool for performing work on a workpiece, the compliant end effector comprising:

a mounting assembly including a mounting bracket that forms an opening, said mounting bracket being rigidly secured to the robotic arm;

a gripping assembly including a support bracket, the implement being rigidly secured to said support bracket;

a biasing assembly including a biasing ring positioned between said mounting bracket and said support bracket, said biasing ring forming an opening, the implement passing through said openings in said biasing ring and said mounting bracket, said biasing ring biasing the implement and said gripping assembly into a biased position, the reference axis of the implement forming a reference line when in said biased position, and, a compliant assembly joining said mounting and gripping assemblies, said complaint assembly allowing the implement and said gripping assembly to pivot out of said biased position and the implement being able to pivot about said reference line.

12. The compliant end effector of claim 11, and wherein said compliant assembly allows the implement to pivot out of said biased position in any direction through 360° of rotation about said reference line.

13. The compliant end effector of claim 10, and wherein said biasing assembly further includes a plurality of springs spaced uniformly around said biasing ring.

14. The compliant end effector of claim 13, and wherein said biasing ring is a damper and said biasing ring dampens vibrations associated with said springs.

15. The compliant end effector of claim 14, and wherein said biasing ring has uniformly spaced holes, each of said holes receiving one of said springs.

16. The compliant end effector of claim 13, and wherein said biasing assembly includes an adjustment assembly for compressing said biasing ring and springs to a desired pre-load condition.

17. The compliant end effector of claim 16, and wherein said adjustment assembly is movable relative to said support bracket.

18. The compliant end effector of claim 11, and wherein said opening of said mounting bracket forms a centerline that is inline with said reference line, and said biasing ring is spaced equidistantly around said centerlines of said mounting and gripping assemblies.

19. The compliant end effector of claim 11, and wherein said support bracket has an opening and the implement passed through said openings of said support bracket, biasing ring and mounting bracket.

20. The compliant end effector of claim 18, and wherein said biasing assembly provides uniform pressure to said gripping assembly around said centerline of said gripping assembly when said end effector is in said biased position.

21. The compliant end effector for securing an implement to an arm of a robot, the implement having a reference axis and a tool with a side surface for performing work on a workpiece, the workpiece having a substantially uniform surface with intended and unintended discontinuities, the robot being programmable to move the implement along a uniform path of travel corresponding to the substantially uniform surface of the workpiece, the compliant end effector comprising:

a mounting assembly that includes a mounting bracket with an opening, said mounting bracket being rigidly secured to the arm of the robot;

a gripping assembly that includes a support bracket with an opening, said support bracket rigidly securing the implement to said end effector, the implement passing through said openings or said mounting and support brackets;

a biasing assembly that biases the implement into a biased position, the reference axis of the implement forming a reference line when in said biased position; and, a compliant assembly that joins said mounting assembly to said gripping assembly, said compliant assembly being adapted to allow the reference axis of the tool to move out of alignment with said reference line when the side surface of the tool engages the surface of the workpiece, said biasing assembly maintaining the side surface of the tool in contact with the surface of the workpiece to remove the unintended discontinuity as the robot moves the implement along the uniform path of travel, and said compliant device allows the tool to accommodate the intended discontinuity as the robot moves the implement along the uniform path of travel.

22. The compliant end effector of claim 21, and wherein the substantially uniform surface of the workpiece is arcuate and the robotic arm is programmed to move the implement along an arcuate path of travel corresponding to the arcuate surface of the workpiece, and the compliant assembly is adapted to allow the reference axis of the implement to move out of alignment with the reference line through 360 degree of rotation about said reference line, said biasing assembly maintaining the side surface of the tool in engagement with the arcuate surface of the workpiece throughout the arcuate path of travel of the implement.

23. The compliant end effector of claim 21, and wherein the workpiece has several substantially uniform surfaces, each uniform surface having a different orientation relative to the other, and the robotic arm is programmed move the implement along several uniform paths of travel, each corresponding to one of the substantially uniform surface of the workpiece, and the compliant assembly is adapted to allow the reference axis of the implement to move out of alignment with said reference line through 360 degree of rotation about said reference line, said biasing assembly maintaining the side surface of the tool in engagement with the corresponding uniform surface of the workpiece for each path of travel.

24. The compliant end effector of claim 21, and wherein the implement is a spindle with a rotating shaft, and said reference line is defined by said rotating shaft when in said biased position.

\* \* \* \* \*